United States Patent [19]
Nakamura

[11] Patent Number: 5,520,050
[45] Date of Patent: May 28, 1996

[54] DRIVING AND DETECTING CIRCUIT OF A VIBRATOR

[75] Inventor: Takeshi Nakamura, Nagaokakyo, Japan

[73] Assignee: Murata Manufacturing Co., Ltd., Kyoto-fu, Japan

[21] Appl. No.: 320,391

[22] Filed: Oct. 11, 1994

[30] Foreign Application Priority Data

Oct. 12, 1993 [JP] Japan .................. 5-280166

[51] Int. Cl.$^6$ .................................................. G01P 9/04
[52] U.S. Cl. .................. 73/504.14; 73/504.12; 310/316
[58] Field of Search ............... 310/316, 317, 310/321; 331/156; 73/504.14, 504.12, 504.13, 504.15, 504.16, 505, DIG. 1, DIG. 4

[56] References Cited

U.S. PATENT DOCUMENTS

4,255,965  3/1981  Shulz et al. .................. 73/35
5,220,833  6/1993  Nakamura .................. 73/505

*Primary Examiner*—John E. Chapman
*Attorney, Agent, or Firm*—Nikaido, Marmelstein, Murray & Oram

[57] ABSTRACT

First switching elements 28, 30 and resistors 36, 38 are connected to piezoelectric elements 16a, 16b of a vibrating gyroscope 12. An oscillation circuit 32 and a phase correction circuit 34 are connected between a piezoelectric element 16c and the first switching elements 28, 30. The piezoelectric elements 16a, 16b are connected to a differential circuit 40, and an output signal of the differential circuit 40 is applied to a sample and hold circuit 44 via a second switching element 42. A zero-crossing detector 46 is connected to the phase correction circuit 34. The first switching elements 28, 30 are turned OFF, and the second switching element 42 is turned ON when zero-crossing points of driving signal is detected.

8 Claims, 9 Drawing Sheets

DRIVING
SIGNAL

FIG. 4B

OUT PUT OF
ZERO-CROSSING
DETECTOR

DRIVING SIGNAL

FIG. 7B

OUT PUT OF ZERO-CROSSING DETECTOR

FIG. 7C

OUT PUT OF ZERO-CROSSING DETECTOR

FIG. 8A

DRIVING
SIGNAL

FIG. 8B

OUT PUT OF
ZERO-CROSSING
DETECTOR

DRIVING AND DETECTING CIRCUIT OF A VIBRATOR

BACKGROUND OF THE INVENTION

1. Field of the Invention

The present invention relates to a driving and detecting circuit of a vibrator, and particularly to a driving and detecting circuit of vibrator used for a vibrating gyroscope, an acceleration sensor or a pressure sensor using a vibrator.

2. Description of the Prior Art

Figure 10:
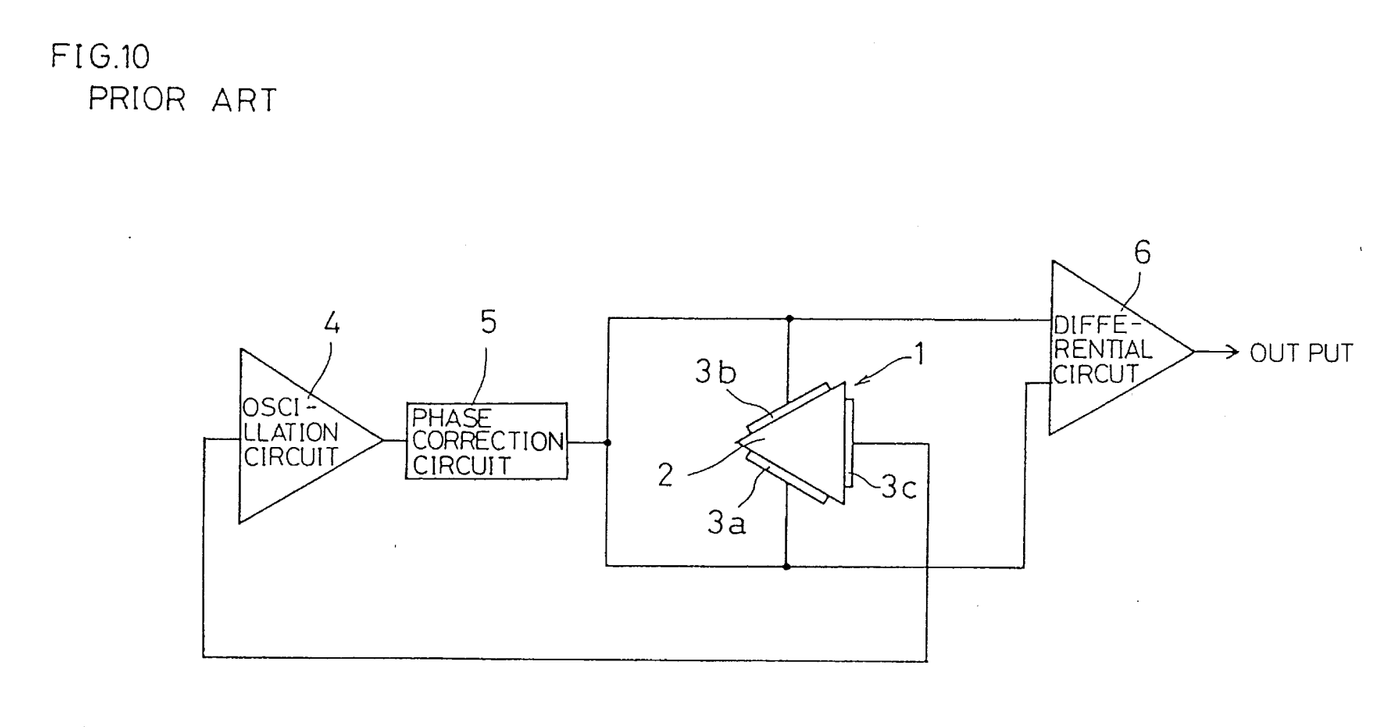
FIG. 10 is an illustrative view showing an example of a conventional driving and detecting circuit of a vibrator.

FIG. 10 is an illustrative view showing a conventional driving and detecting circuit of a vibrating gyroscope which is a background of the present invention. A vibrating gyroscope 1 includes a vibrating body 2 having, for example, a regular triangular prism shape. The vibrating body 2 is formed with a material that generates a mechanical vibration such as elinver. Piezoelectric elements 3a, 3b and 3c are formed on three side faces of the vibrating body 2. The piezoelectric elements 3a and 3b are used for driving a bending vibration to the vibrating body 2, and for detecting a signal corresponding to a rotational angular velocity applied to the vibrating gyroscope 1. The piezoelectric element 3c is used for feedback when the vibrating body 2 is self-oscillated.

An oscillation circuit 4 and a phase correction circuit 5 are connected between the piezoelectric elements 3a, 3b and the piezoelectric element 3c. The piezoelectric elements 3a and 3b are connected to a differential circuit 6. The vibrating body 2 bends and vibrates in a direction perpendicular to a face of the piezoelectric element 3c by applying a signal from the oscillation circuit 4. In this state, signals applied to the piezoelectric elements 3a and 3b are the same signal, and a driving signal component is not obtained from the differential circuit 6. Since the vibrating body 2 bends and vibrates in a direction perpendicular to the face of the piezoelectric element 3c, signals generated in the piezoelectric elements 3a and 3b are the same signal, and the signals generated in the piezoelectric elements 3a and 3b are not obtained from the differential circuit 6. As such, an output signal from the differential circuit 6 is zero, and it is known that the rotational angular velocity is not applied to the vibrating gyroscope 1.

When the vibrating gyroscope 1 rotates on its axis, a vibrating direction of the vibrating body 2 changes by a Coriolis force. A difference is produced between output signals of the piezoelectric elements 3a and 3b by the change in vibrating direction, and the difference of the output signals is obtained from the differential circuit 6. Since an output signal of the differential circuit 6 corresponds to the rotational angular velocity applied to the vibrating gyroscope 1, the rotational angular velocity can be detected by measuring the output signal of the differential circuit 6.

However, when a vibrating gyroscope is used, there is a possibility that a difference of resonance characteristics is produced between two resonance systems including two driving piezoelectric elements by an impedance change of the piezoelectric elements or a frequency change of the driving signal due to, for example, an environmental temperature change. In this case, a difference is produced between driving signals applied to two piezoelectric elements, and a signal corresponding to the difference between the driving signals is obtained from the differential circuit. Thus, an output signal is obtained from the differential circuit even when the rotational angular velocity is not applied, and it causes drift. When the difference is produced between the resonance characteristics of resonance systems, the disturbance is produced in vibrational attitude of the vibrating body. The disturbance appears as the displacement of the vibrating body, and a signal is obtained from the differential circuit even when the rotational angular velocity is not applied, and it causes drift.

In order to cover the disadvantage, methods such as addding a learning function to the circuit or using plural synchronous detecting circuits are considered. However, in these methods, circuit scale becomes large, and the large scale circuit is not extremely satisfactory though it is an excellent method under specific conditions.

SUMMARY OF THE INVENTION

It is, therefore, the primary object of the present invention is to provide a driving and detecting circuit of a vibrator which has a simple circuit and can reduce drift produced by differences of resonance characteristics due to an environmental temperature change.

The present invention is directed to a driving and detecting circuit of a vibrator having plural driving and detecting means used both for driving and detecting, comprising an oscillation circuit for applying driving signals to the driving and detecting means for driving a vibration to the vibrator, at least one first switching element for applying driving signals having the same level and the same phase from the oscillation circuit to the plural driving and detecting means, a differential circuit for measuring a difference of output signals between the plural driving and detecting means, a second switching element connected to an output side of the differential circuit, a sample and hold circuit connected to the second switching element, and a zero-crossing detector for detecting a zero-crossing point per period of the driving signal applied to the driving and detecting means, wherein the first switching element is turned OFF and the second switching element is turned ON when the zero-crossing detector detects the zero-crossing points of the driving signal.

The present invention is directed to a driving and detecting circuit of a vibrator having plural driving and detecting means used both for driving and detecting, comprising an oscillation circuit for applying driving signals to the driving and detecting means for driving a vibration to the vibrator, at least one first switching element for applying driving signals having the same level and the same phase from the oscillation circuit to the plural driving and detecting means, a first differential circuit for measuring a difference of output signals between the plural driving and detecting means, a second switching element connected to an output side of the first differential circuit, a first sample and hold circuit connected to the second switching element, a third switching element connected to an output side of the differential circuit, a second sample and hold circuit connected to the third switching element, a second differential circuit for measuring an output difference between the two sampling hold circuits, and a zero-crossing detector for detecting a zero-crossing point of the driving signal applied to the driving and detecting means, wherein the first switching element is turned OFF and the second switching element and the third switching element are alternately turned ON when the zero-crossing detector detects the zero-crossing points of the driving signal.

The driving signals having the same level and the same phase are applied from the oscillating circuit to the driving and detecting means by the first switching element. Thus, the disturbance of the vibrational attitude of the vibrating body (i.e. a state that the vibratory body bends and vibrates not in a direction perpendicular to the feedback piezoelectric element) due to the difference of resonance characteristics of resonance systems can be prevented. In this state, when the first switching element is turned OFF and the second switching element is turned ON at the time of zero-crossing per period of the driving signal, the detecting signal corresponding to the rotational angular velocity can be obtained from the differential circuit in the correct vibrational attitude. Since the vibrating body is driven by the driving signals having the same level and the same phase, the driving signals are offset by the differential circuit at the time of detecting. Thus, only the detecting signal, not including the driving signal, can be obtained from the differential circuit.

In the driving and detecting circuit including two switching elements and two sampling hold circuits, all zero-crossing points of the driving signal are detected, and the second switching element and the third switching element are alternately turned ON by the output signal of the zero-crossing detector. Thus, the inverse level parts of the driving signal from the differential circuit are applied to two sampling hold circuits. When the difference of output signals between two sampling hold circuits is obtained by the separate differential circuit, a large output signal can be obtained. When disturbance is produced in a vibrational attitude of the vibrating body (i.e. movement of the vibratory body at the time of non-rotation) and a curvature is produced in the vibrating body due to environmental temperature change, the signals corresponding to the curvature of the vibrating body, applied to two sampling hold circuits, are the same signal. Thus, when the difference of output signals between two sampling hold circuits is obtained, the signals corresponding to the curvature of the vibrating body are offset.

According to the present invention, influence of the driving signal due to the difference of resonance characteristics of the vibrating gyroscope or drift due to the disturbance of the vibrational attitude of the vibrating body can be prevented. As such, it is possible to prevent drift due to environmental temperature change, and detect the rotational angular velocity correctly. A simple circuit can be obtained as compared with the circuit adding the learning function or the circuit including plural synchronous detecting circuits.

The above and further objects, features, aspects and advantages of the present invention will be more fully apparent from the following detailed description with the accompanying drawings.

DESCRIPTION OF THE PREFERRED EMBODIMENTS

Figure 1:
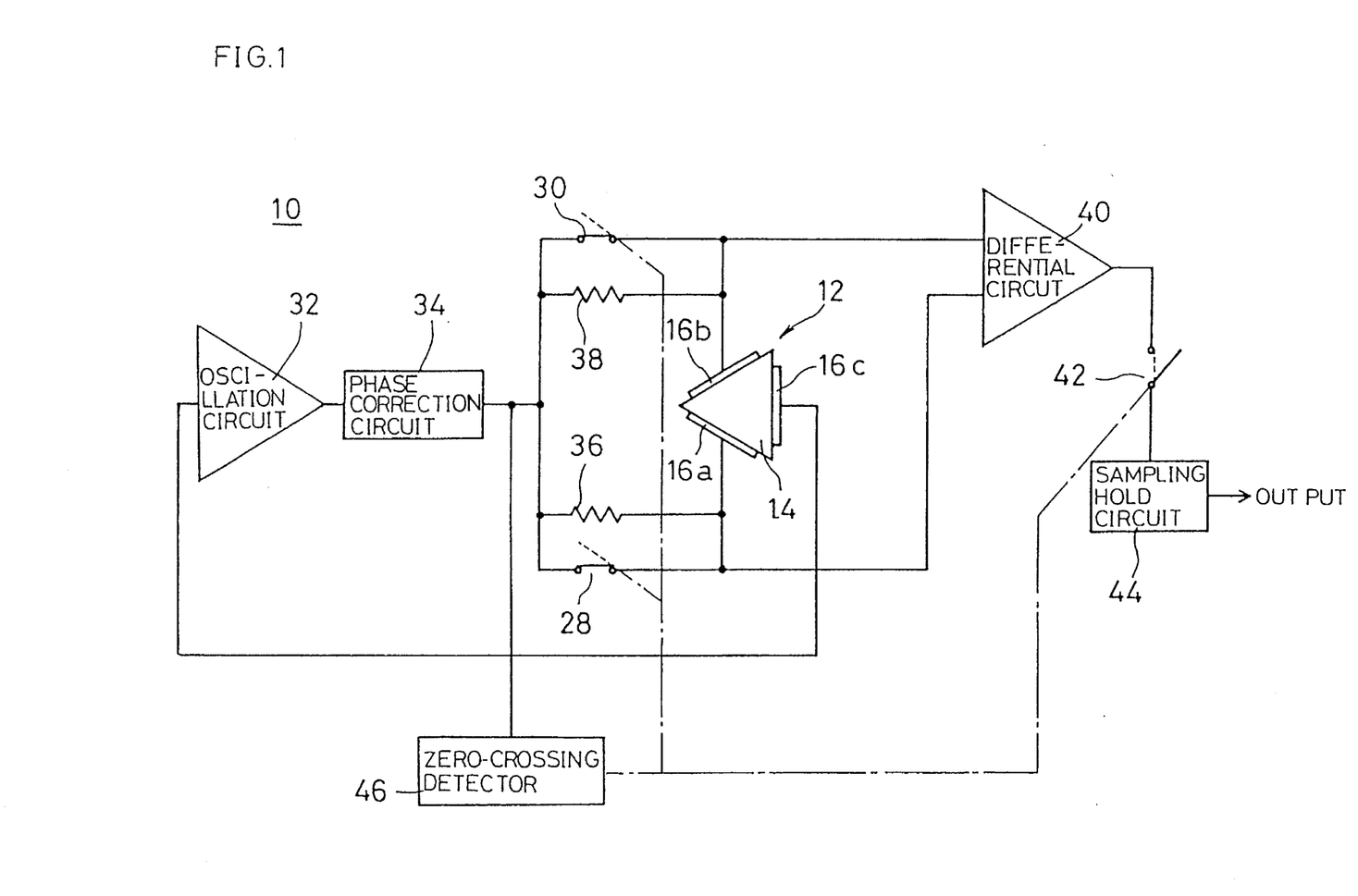
FIG. 1 is an illustrative view showing one embodiment of the present invention.
Figure 2:
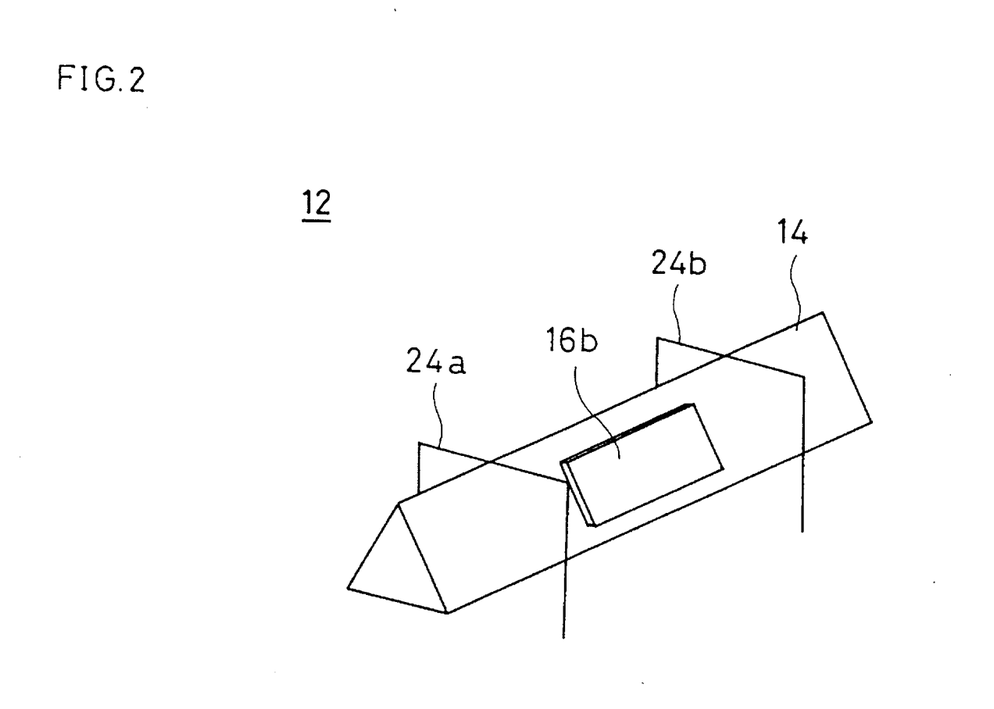
FIG. 2 is a perspective view showing a vibrating gyroscope applying a driving and detecting circuit of FIG. 1.
Figure 3:
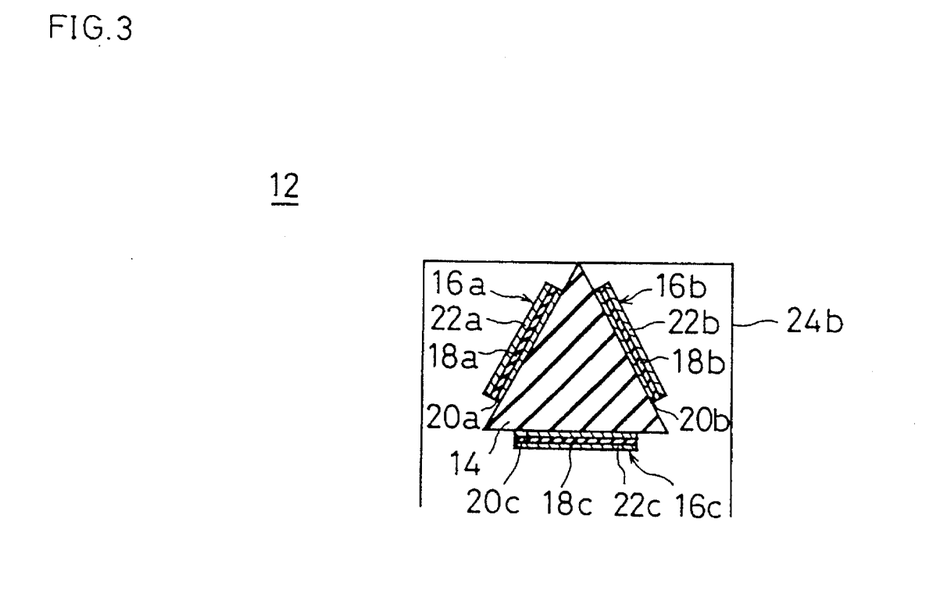
FIG. 3 is a sectional view showing the vibrating gyroscope of FIG. 2.

FIG. 1 is an illustrative view showing one embodiment of the present invention. A driving and detecting circuit of a vibrator 10 is used for a vibrating gyroscope using, for example, a piezoelectric vibrator. A vibrating gyroscope 12 includes a vibrating body 14 having, for example, a regular triangular prism shape as shown in FIG. 2 and FIG. 3. The vibrating body 14 is formed with materials that generate a mechanical vibration such as elinver, iron-nickel alloy, quartz, glass, crystal, ceramics or the like.

Piezoelectric elements 16a, 16b and 16c are formed at center portions on three side faces of the vibrating body 14. The piezoelectric element 16a includes a piezoelectric layer 18a made of, for example, piezoelectric ceramics, and electrodes 20a and 22a are formed on both faces of the piezoelectric layer 18a. One electrode 20a is bonded to the side face of the vibrating body 14. Similarly, piezoelectric elements 16b and 16c include piezoelectric layers 18b and 18c, and electrodes 20b, 22b and electrodes 20c, 22c are formed on both faces of the piezoelectric layers 18b, 18c. Electrodes 20b, 20c of the piezoelectric elements 16b, 16c are bonded to the side faces of the vibrating body 14. The vibrating body 14 is supported with supporting members 24a and 24b made of, for example, metal wires in the neighborhood of nodal points. The supporting members 24a and 24b are fixed by, for example, welding in the neighborhood of nodal points of the vibrating body 14.

First switching elements 28 and 30 are connected to the piezoelectric elements 16a and 16b. As the first switching elements 28 and 30, the switching elements such as an FET (field effect transistor) may be used. An oscillation circuit 32 and a phase correction circuit 34 are connected between the first switching elements 28, 30 and the piezoelectric element 16c. Resistors 36 and 38 may be connected to the first switching elements 28, 30 in parallel. The piezoelectric elements 16a and 16b are used as driving and detecting means, namely, used for driving a bending vibration to the vibrating gyroscope 12, and used for detecting a signal corresponding to a rotational angular velocity. The piezoelectric element 16c is used for feedback in order to continue a bending vibration by detecting an amplitude of the vibrating gyroscope 12.

Figure 4A:
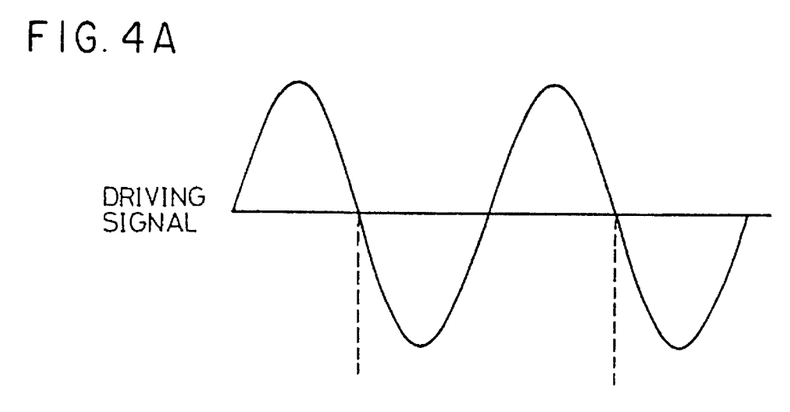
FIG. 4 is a graph showing a relationship between a driving signal and an output signal of a zero-crossing detector of the driving and detecting circuit shown in FIG. 1.
Figure 4B:
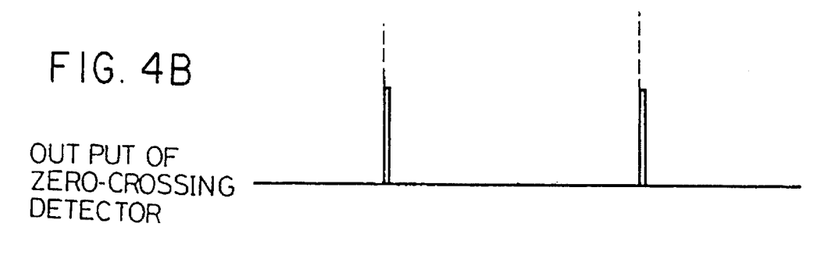

The piezoelectric elements 16a and 16b are connected to a differential circuit 40, and a difference of signals between the piezoelectric elements 16a and 16b is obtained from the differential circuit 40. The differential circuit 40 is connected to a sample and hold circuit 44 via a second switching element 42. As the second switching element 42, the switching element such as an FET may be used. The phase correction circuit 34 is connected to a zero-crossing detector 46. As shown in FIG. 4, the zero-crossing detector 46 is a circuit for detecting the zero-crossing point per one period of a signal obtained from the phase correction circuit 34, and for producing a pulse signal at the time of detecting the zero-crossing point of the signal. The pulse signal from the zero-crossing detector 46 is applied to the first switching elements 28, 30 and the second switching element 42. The first switching elements 28 and 30 are in an ON state usually as shown by the solid line in FIG. 1. The first switching elements 28 and 30 are turned OFF at the time when the pulse signal is applied as shown by the dotted line in FIG. 1. The second switching element 42 is in an OFF state usually, and is turned ON at the time when the pulse signal is applied.

When the vibrating gyroscope 12 is used, the vibrating body 14 bends and vibrates in a direction perpendicular to the face of the piezoelectric element 16c by the oscillation circuit 32 and the phase correction circuit 34. When the rotational angular velocity is not applied to the vibrating gyroscope 12, the driving signals applied to the piezoelectric elements 16a and 16b are the same signal, and the signals produced in the piezoelectric elements 16a and 16b by the bending vibration of the vibrating body 14 are the same signal. Thus, the driving signal and the signal corresponding to the rotational angular velocity are not obtained from the differential circuit 40.

In this state, when the vibrating body 14 rotates on its axis, the direction of bending vibration of the vibrating body 14 changes due to a Coriolis force. Thus, the difference between the output signals is produced from the piezoelectric elements 16a and 16b. The difference between the signals from the piezoelectric elements 16a and 16b is obtained from the differential circuit 40, and the rotational angular velocity applied to the vibrating gyroscope 12 can be detected by measuring the difference between the signals.

In the driving and detecting circuit 10, the zero-crossing point per one period of a driving signal for driving a bending vibration to the vibrating body 14 is detected by the zero-crossing detector 46, and the first switching elements 28, 30 and the second switching element 42 are controlled. When the zero-crossing points of the driving signal are not detected, the first switching elements 28 and 30 are in an ON state, and the driving signal is applied to the piezoelectric elements 16a and 16b. At this time, the second switching element 42 is in an OFF state, and the output signal from the differential circuit 40 is not applied to the sampling hold circuit 44.

When the zero-crossing points of the driving signal are detected, pulse signals are obtained from the zero-crossing detector 46, and the first switching elements 28 and 30 are turned OFF, and the second switching element 42 is turned ON. Thus, only the signal produced by the piezoelectric elements 16a and 16b by bending vibration of the vibrating body 14 can be obtained from the differential circuit 40, and it does not include a driving signal component. Even when an impedance difference between the piezoelectric elements 16a, 16b or a frequency difference between driving signals applied to the piezoelectric elements 16a, 16b is produced by a change in environmental temperature, influence of the driving signal can be prevented at the time of detecting the signal corresponding to the rotational angular velocity. The output signal of the differential circuit 40 is applied to the sample and hold circuit 44. The signal applied to the sampling hold circuit 44 is held until a following output signal of the differential circuit 40 is applied by turning ON the second switching element 42. A signal held in the sample and hold circuit 44 is obtained from the sampling hold circuit 44 maintaining its value until the following signal is applied.

By using the driving and detecting circuit 10, the signal corresponding to the rotational angular velocity can be measured without influence from the driving signal. A change in the driving signal due to the influence of environmental temperature change on the signal corresponding to the rotational angular velocity can be prevented. Only the signal corresponding to the rotational angular velocity can be measured, and the rotational angular velocity can be detected correctly. In the driving and detecting circuit 10, though the first switching elements 28 and 30 are turned OFF at the time of detecting the zero-crossing points of the driving signal, since an energy for driving the vibrating body 14 is in proportion to the amplitude of the driving signal, the energy for driving the vibrating body 14 becomes zero at the time of the zero-crossing points of the driving signal, and there is no problem even if the first switching elements 28 and 30 are turned OFF. In the case of the vibrating gyroscope 12, since a Coriolis force due to the rotational angular velocity is in proportion to an amplitude speed of the vibrating body 14, the signal corresponding to the rotational angular velocity becomes a maximum value at the time of the zero-crossing points of the driving signal. Thus, by using the driving and detecting circuit 10, a detecting sensitivity of the rotational angular velocity can be increased.

Figure 5:
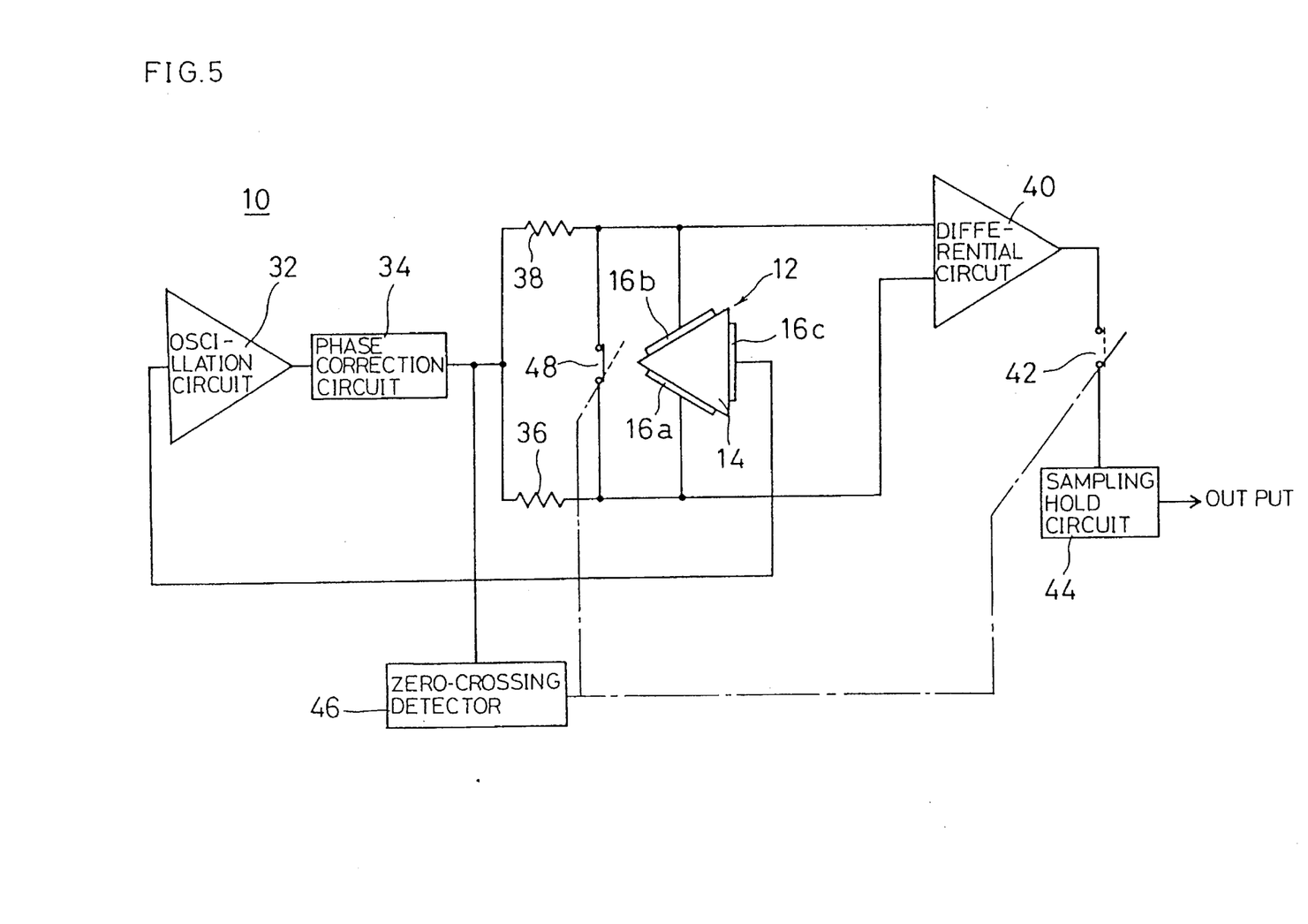
FIG. 5 is an illustrative view showing another embodiment of the present invention.

FIG. 5 is an illustrative view showing another embodiment of the present invention. In the driving and detecting circuit 10, the phase correction circuit 34 is connected to the piezoelectric elements 16a and 16b via the resistors 36 and 38. A first switching element 48 is connected between the piezoelectric elements 16a and 16b. Usually, the first switching element 48 is in an ON state, and the second switching element 42 is in an OFF state. When the zero-crossing point of driving signal per one period is detected, the first switching element 48 is turned OFF, and the second switching element 42 is turned ON.

The vibrating body 14 consists of two resonance systems including the piezoelectric elements 16a and 16b. The disturbance is produced in a vibrational attitude of the vibrating body 14, when an impedances of the resonance systems or a frequency of the driving signal changes due to, for example, a change in environmental temperature. The disturbance of the vibrational attitude appears as output signals from the piezoelectric elements 16a and 16b, and the rotational angular velocity is detected in error in spite of not applying the rotational angular velocity. In the driving and detecting circuit 10, since the first switching element 48 is usually in an ON state, the piezoelectric element 16a side and the piezoelectric element 16b side are inphase, and the vibrational attitude of the vibrating body 14 can be kept normal.

By turning OFF the first switching element 48 and turning ON the second switching element 42 at the time of detecting the zero-crossing points of the driving signal, the signal corresponding to the rotational angular velocity can be obtained with a normal vibrational attitude. At this time, since the first switching element 48 is in an OFF state, the piezoelectric element 16a side and the piezoelectric element 16b side are not short-circuited, and the signal corresponding to the rotational angular velocity is obtained correctly from the differential circuit. By using the driving and detecting circuit 10, a detection error by a change of the vibrational attitude of the vibrating body 14 due to the change of an environmental temperature can be prevented.

Figure 6:
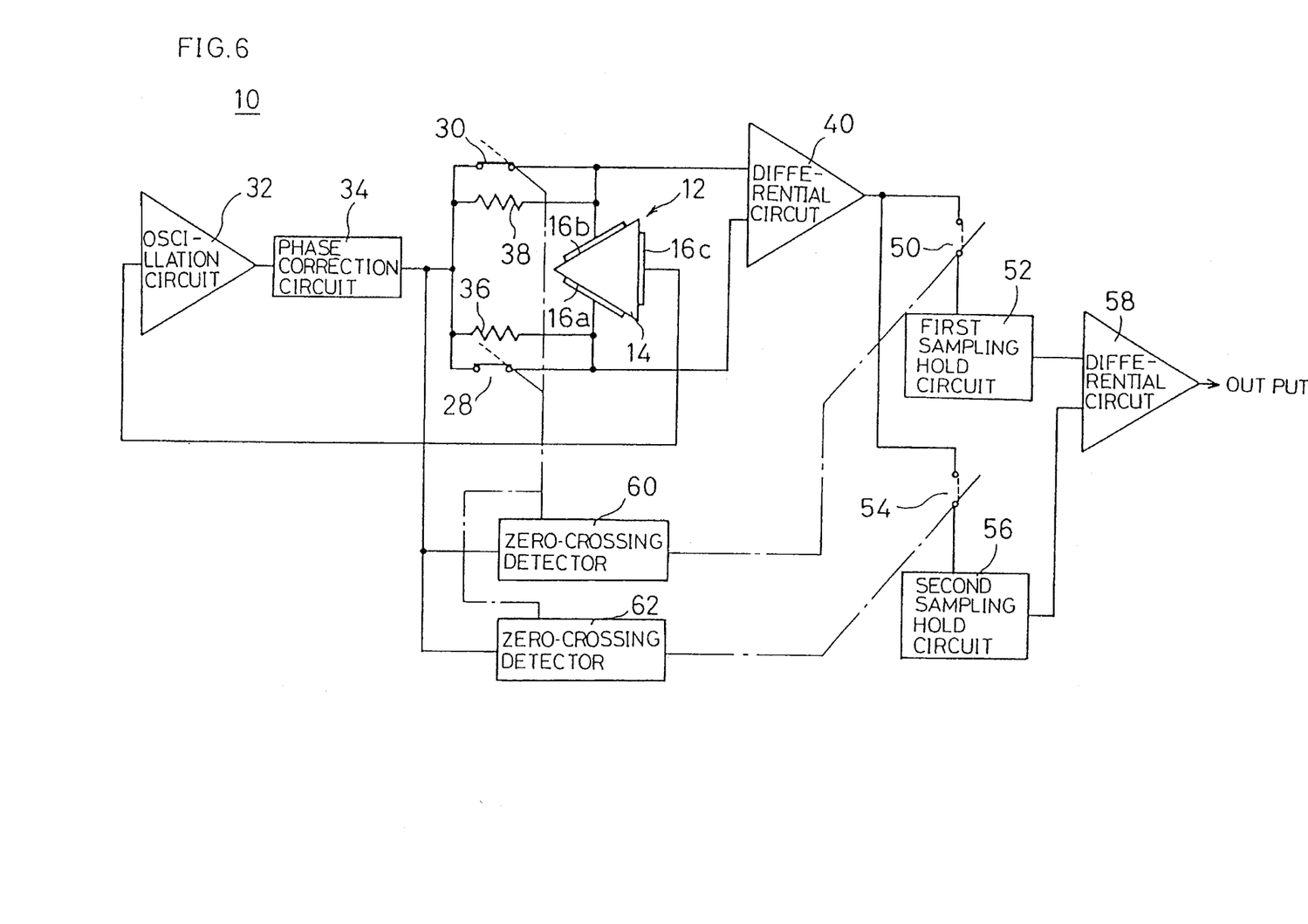
FIG. 6 is an illustrative view showing a still further embodiment of the present invention.

FIG. 6 is an illustrative view showing a still further embodiment of the present invention. In the driving and detecting circuit 10, as well as FIG. 1, the first switching elements 28 and 30 are connected between the phase correction circuit 34 and the piezoelectric elements 16a, 16b. The output signal of the differential circuit 40 is applied to a first sample and hold circuit 52 via a second switching element 50. Similarly, the output signal of the differential circuit 40 is applied to a second sample and hold circuit 56 via a third switching element 54. Output signals from the sampling hold circuits 52 and 56 are applied to a separate differential circuit 58. The second switching element 50 and the third switching element 54 are usually in an OFF state.

Figure 7A:
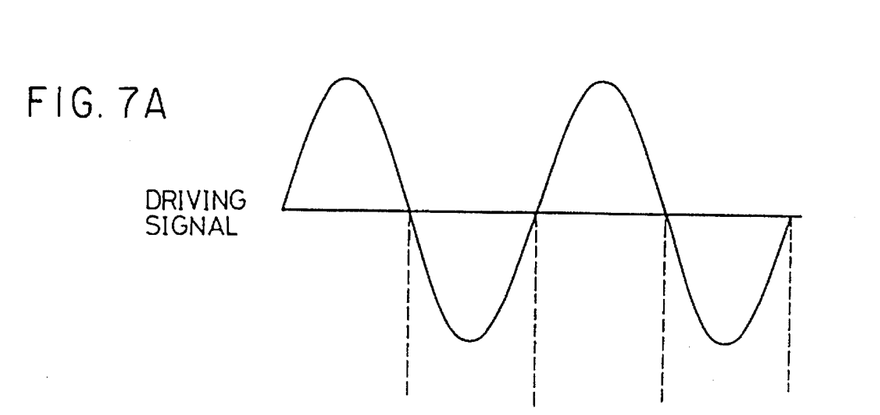
FIG. 7 is a graph showing a relationship between output signals of two zero-crossing detectors and the driving signal using in driving and detecting circuit of FIG. 6.
Figure 7B:
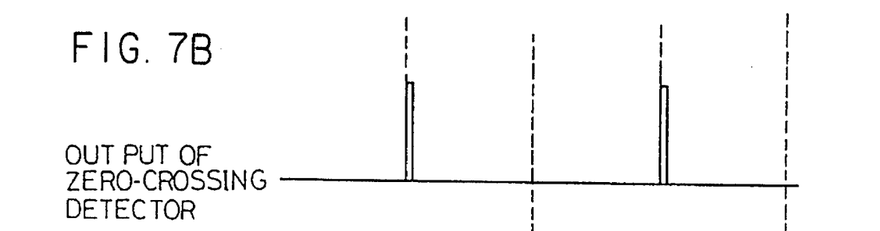
Figure 7C:
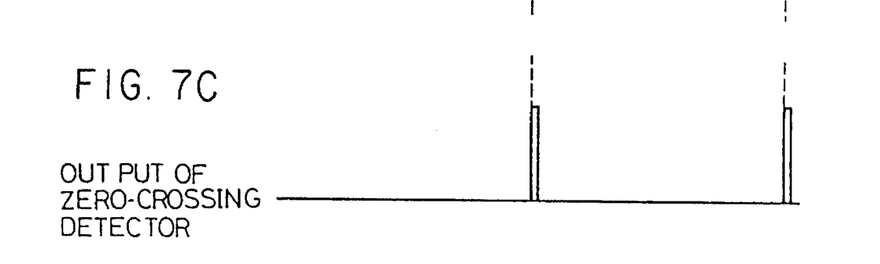

The output signal of the phase correction circuit 34 is applied to two zero-crossing detectors 60 and 62. Though the zero-crossing detectors 60 and 62 detect respectively the zero-crossing point per one period of the driving signal, as shown in FIG. 7, the zero-crossing points, having a difference of a half period, are detected relative to each other. Thus, the output signal obtained from one zero-crossing detector 60 and the output signal obtained from the other zero-crossing detector 62 have a difference of a half period of the driving signal. The second switching element 50 is turned ON by the output signal of the zero-crossing detector 60. The third switching element 54 is turned ON by the output signal of the zero-crossing detector 62. The first switching elements 28 and 30 are turned OFF by the output signals of the zero-crossing detectors 60 and 62.

When the rotational angular velocity is not applied to the vibrating gyroscope 12, the output signal of the differential circuit 40 is zero, and a signal is not obtained from the sample and hold circuits 52 and 56. When the rotational angular velocity is applied to the vibrating gyroscope 12, the output signal is obtained from the differential circuit 40. The signal has the same period as the bending vibration of the vibrating body 14, that is the period of the driving signal. By controlling the switching elements 50 and 54 according to the output signals of the zero-crossing detectors 60 and 62, the signals having an inverse level are applied to the sampling hold circuits 52 and 56. By obtaining the difference between output signals, from the sample and hold circuits 52 and 54, output from the differential circuit 58, a large signal corresponding to the rotational angular velocity can be obtained.

In case a curvature is produced in the vibrating body 14 by the disturbance of the vibrational attitude of the vibrating body 14 due to a change in environmental temperature, an output signal due to the curvature of the vibrating body 14 is obtained from the differential circuit 40 and overlapped to the signal corresponding to the rotational angular velocity. Since the signal due to the curvature of the vibrating body 14 is the same signal at the time of detecting the zero-crossing points by both the zero-crossing detectors 60 and 62, the signals corresponding to the curvature of the vibrating body 14 included in the input signals to the sampling hold circuits 52 and 56 are, from the differential circuit 58, a same signal. By obtaining the difference between the signals from the sampling hold circuits 52 and 56, the signals corresponding to the curvature of the vibrating body 14 are offset. As such, by using the driving and detecting circuit 10 shown in FIG. 6, an influence by the disturbance of the vibrational attitude of the vibrating body 14 due to a change in environmental temperature can be prevented, and a large signal corresponding to the rotational angular velocity can be obtained.

Figure 8A:
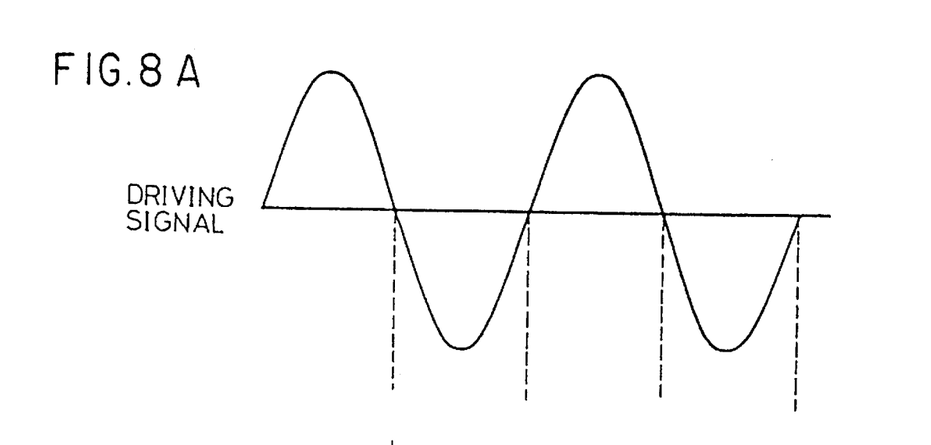
FIG. 8 is a graph showing a relationship between an output signal of a separate zero-crossing detector and the driving signal using in driving and detecting circuit of FIG. 6.
Figure 8B:
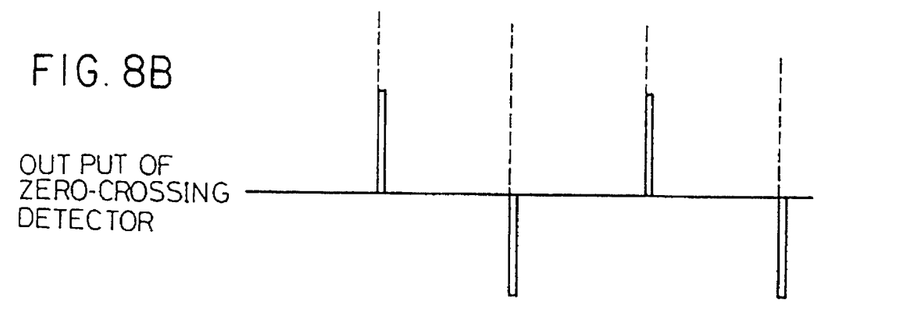

In the circuit shown in FIG. 6, the zero-crossing detector of which an output signal turns its positive and negative levels alternately as shown in FIG. 8 may be used. From such a zero-crossing detector, output signals having inverse levels are obtained per half period of the driving signal. Thus, by making the second switching element 50 turn ON according to a positive output signal, and making the third switching element 54 turn ON according to a negative output signal, the same effect as above-mentioned can be obtained. By using such a zero-crossing detector, two switching elements 50 and 54 can be controlled by one zero-crossing detector.

Figure 9:
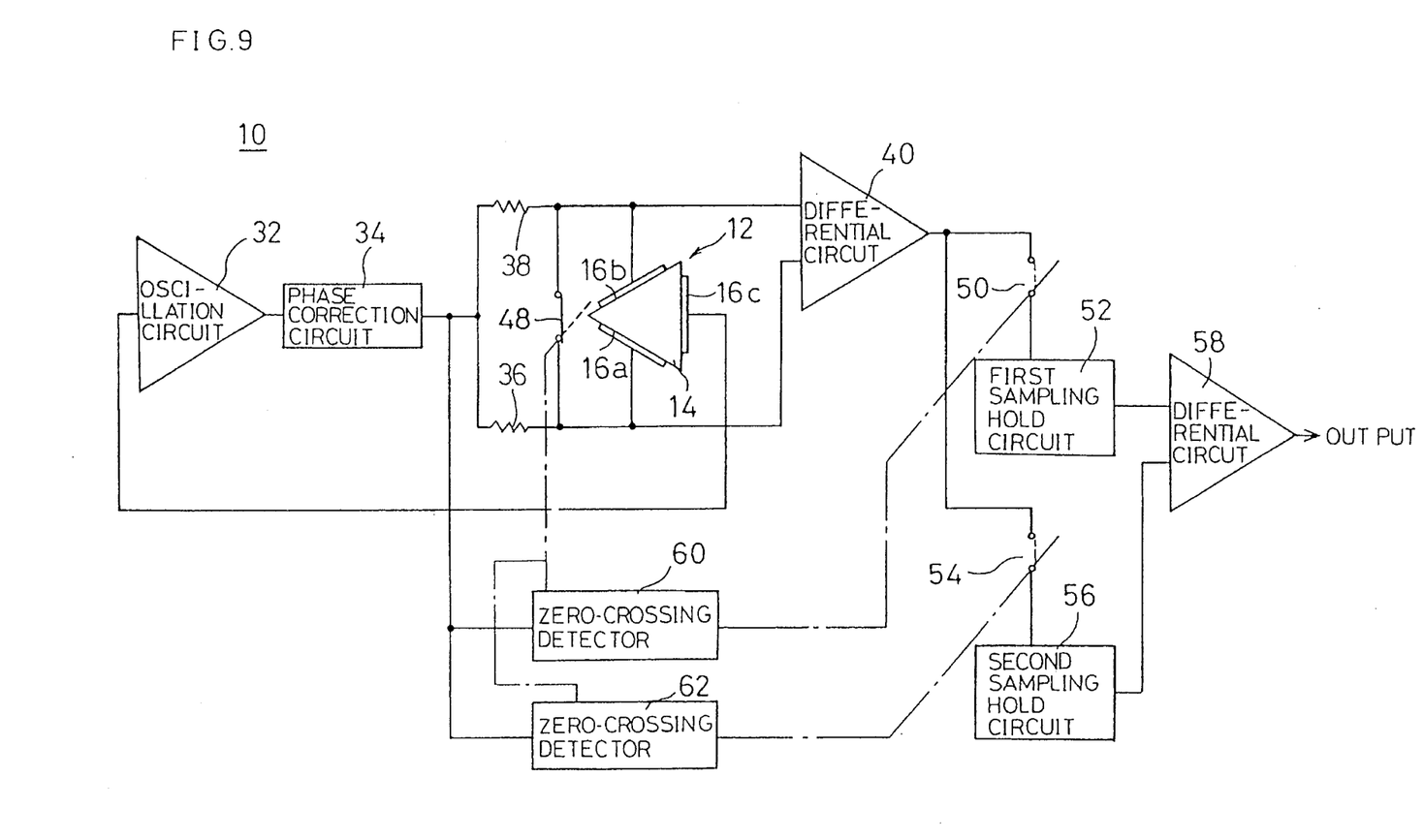
FIG. 9 is an illustrative view showing an another embodiment of the present invention.

The circuit having two switching elements and two sampling hold circuits connected to the differential circuit may be applied to the circuit having the first switching element connected between the piezoelectric elements 16a and 16b as shown in FIG. 9.

In the above mentioned embodiments, though the driving and detecting circuit is applied to the vibrating gyroscope, the driving and detecting circuit may be applied to an acceleration sensor or a pressure sensor including piezoelectric elements used both for driving and detecting.

While the present invention has been particularly described and shown, it is to be understood that such description is used merely as an illustration and example rather than limitation, and the spirit and scope of the present invention is determined solely by the terms of the appended claims.

What is claimed is:

1. A driving and detecting circuit of a vibrator having plural driving and detecting means for using both as driving and detecting, comprising:

an oscillation circuit for applying driving signals to said plural driving and detecting means for driving said vibrator to vibrate;

at least one first switching element for applying driving signals having a same level and a same phase from said oscillation circuit to said plural driving and detecting means;

a differential circuit for measuring a difference of output signals between said plural driving and detecting means;

a second switching element connected to an output side of said differential circuit;

a sampling hold circuit connected to said second switching element; and a zero-crossing detector for detecting a zero-crossing point per period of said driving signal applied to said driving and detecting means, wherein said first switching element is turned OFF and said second switching element is turned ON when said zero-crossing detector detects the zero-crossing points of said driving signal.

2. A driving and detecting circuit in accordance with claim 1, wherein said vibrator includes a regular triangular prism shaped vibrating body and piezoelectric elements formed on three side faces of said vibrating body, and two of said piezoelectric elements are used as said plural driving and detecting means.

3. A driving and detecting circuit in accordance with claim 2, wherein at least two first switching elements are provided and connected respectively to said two piezoelectric elements, and said driving signal is applied to said two piezoelectric elements via said first switching elements.

4. A driving and detecting circuit in accordance with claim 2, wherein said driving signal is applied to said two piezoelectric elements, and said first switching element is connected between said two piezoelectric elements.

5. A driving and detecting circuit of a vibrator having plural driving and detecting means for using both as driving and detecting, comprising:

an oscillation circuit for applying driving signals to said plural driving and detecting means for driving said vibrator to vibrate;

at least one first switching element for applying driving signals having a same level and a same phase from said oscillation circuit to said plural driving and detecting means;

a differential circuit for measuring a difference of output signals between said plural driving and detecting means;

a second switching element connected to an output side of said differential circuit;

a sampling hold circuit connected to said second switching element;

a third switching element connected to an output side of said differential circuit;

a separate sampling hold circuit connected to said third switching element;

a separate differential circuit for measuring an output difference between said two sampling hold circuits; and a zero-crossing detector for detecting a zero-crossing point of said driving signal applied to said driving and detecting means; wherein said first switching element is turned OFF and said second switching element and said third switching element are alternately turned ON when said zero-crossing detector detects the zero-crossing points of said driving signal.

6. A driving and detecting circuit in accordance with claim 5, wherein said vibrator includes a regular triangular prism shaped vibrating body and piezoelectric elements formed on three side faces of said vibrating body, and two of said piezoelectric elements are used as said plural driving and detecting means.

7. A driving and detecting circuit in accordance with claim 6, wherein at least two first switching elements are provided and connected respectively to said two piezoelectric elements, and said driving signal is applied to said two piezoelectric elements via said first switching elements.

8. A driving and detecting circuit in accordance with claim 6, wherein said driving signal is applied to said two piezoelectric elements, and said first switching element is connected between said two piezoelectric elements.

* * * * *